(12) United States Patent
Salsman

(10) Patent No.: US 9,243,890 B2
(45) Date of Patent: Jan. 26, 2016

(54) VIDEO OVERLAY SYSTEMS

(71) Applicant: Semiconductor Components Industries, LLC, Phoenix, AZ (US)

(72) Inventor: Kenneth Edward Salsman, Pleasanton, CA (US)

(73) Assignee: Semiconductor Components Industries, LLC, Phoenix, AZ (US)

(*) Notice: Subject to any disclaimer, the term of this patent is extended or adjusted under 35 U.S.C. 154(b) by 379 days.

(21) Appl. No.: 13/660,929

(22) Filed: Oct. 25, 2012

(65) Prior Publication Data

US 2013/0106911 A1    May 2, 2013

Related U.S. Application Data

(60) Provisional application No. 61/551,292, filed on Oct. 25, 2011.

(51) Int. Cl.
*G09G 5/00* (2006.01)
*G01B 11/00* (2006.01)

(52) U.S. Cl.
CPC .................................... *G01B 11/00* (2013.01)

(58) Field of Classification Search
None
See application file for complete search history.

(56) References Cited

U.S. PATENT DOCUMENTS

| | | | | |
|---|---|---|---|---|
| 7,369,101 | B2* | 5/2008 | Sauer et al. | 345/8 |
| 7,920,071 | B2* | 4/2011 | Baillot | 340/937 |
| 7,928,977 | B2* | 4/2011 | Tanimura et al. | 345/419 |
| 8,050,461 | B2* | 11/2011 | Shpunt et al. | 382/106 |
| 8,449,122 | B2* | 5/2013 | Luo | 353/70 |
| 2011/0288818 | A1* | 11/2011 | Thierman et al. | 702/159 |
| 2012/0214588 | A1 | 8/2012 | You et al. | |

\* cited by examiner

*Primary Examiner* — Ryan R Yang
(74) *Attorney, Agent, or Firm* — Treyz Law Group, P.C.; Zachary D. Hadd; Kendall P. Woodruff

(57) ABSTRACT

A system may include computing equipment and a handheld video overlay accessory. A video overlay accessory may include one or more light sources, an image sensor, and processing circuitry. The video overlay accessory may include an image projector that projects images onto external objects. The video overlay accessory may include a partially transparent beam splitter and a display that projects display content onto the partially transparent beam splitter. A user that views a scene through the partially transparent beam splitter may view the display content apparently overlaid onto the scene. Light sources in the video overlay accessory may be laser diodes or other light-emitting diodes that project tracking spots such as infrared tracking spots on to external objects. The image sensor may be used to capture images of the tracking spots. The processing circuitry may determine distance and position information based on the captured images.

16 Claims, 6 Drawing Sheets

US 9,243,890 B2

VIDEO OVERLAY SYSTEMS

This application claims the benefit of provisional patent application No. 61/551,292, filed Oct. 25, 2011, which is hereby incorporated by reference herein in its entirety.

BACKGROUND

This relates generally to systems that display visual information and, more particularly, to systems that overlay visual content on real-world objects.

Electronic devices often have input-output components. For example, an electronic device may contain an output component such as a display providing visual output to a user. In conventional systems, devices commonly have a display that presents device-generated visual content to the user. In some systems, the device-generated visual content may be altered based on the information about the environment around the device.

For example, a map may be displayed on the display that is oriented based on the orientation of the device in the real world. As another example, images of a real-world scene are sometimes captured and displayed on the device display while device-generated visual content is overlaid on the captured images that are displayed. However, it can be challenging to present device-generated display content combined with real-world scene content using conventional image capture and display systems.

It may therefore be desirable to provide improved image overlay systems.

DETAILED DESCRIPTION

Figure 1:
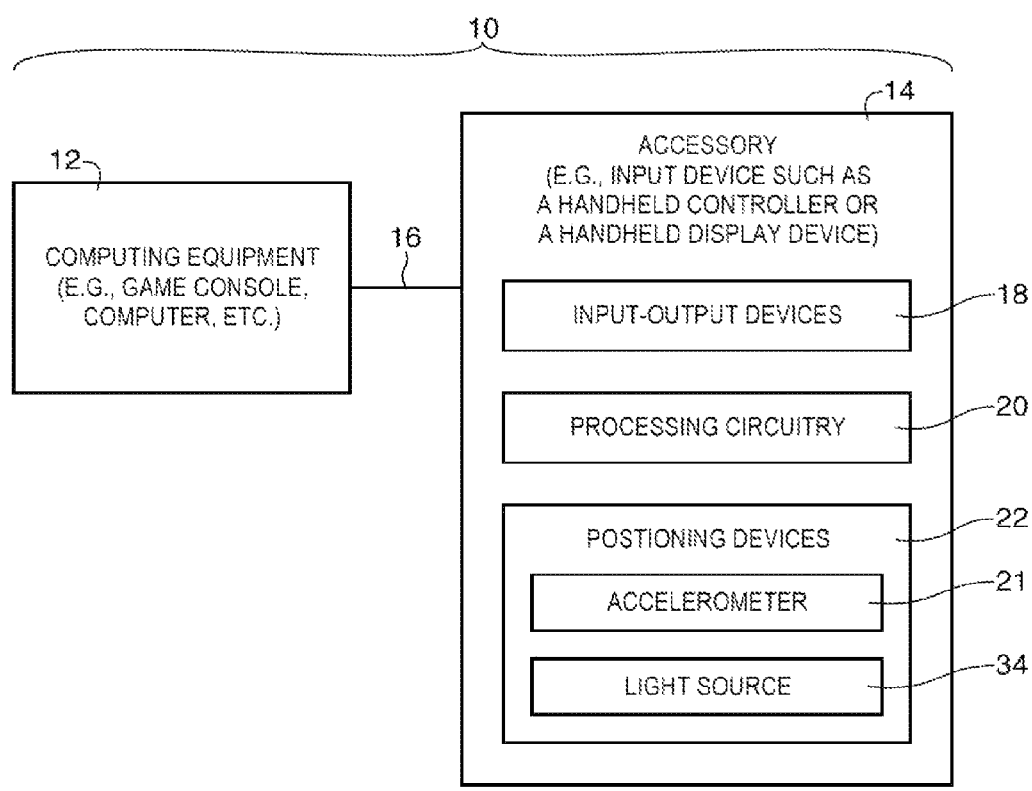
FIG. 1 is a diagram of an illustrative system of the type that may include a video overlay accessory in accordance with an embodiment of the present invention.

An illustrative image overlay system is shown in FIG. 1. As shown in FIG. 1, system 10 may include an accessory 14 that includes input devices-output devices 18, processing circuitry 20, and positioning devices 22. Accessory 14 may be an electronic device such as a handheld controller or handheld display device. A handheld display device may be a video overlay device (video overlay accessory) such as a video overlay projection device (i.e., a device that projects images onto real-world objects) or a video overlay device having a beam splitter that presents images that appear to be located in a real-world scene.

Input-output devices 18 may include input components (e.g., buttons, switches, cameras or other input components) and output components such as a display or an image projector. Positioning devices 22 may include light-emitting devices such as light source 34 that generate light-based marks on real-world objects that can be tracked by accessory 14 (e.g., using an image sensor or camera associated with input-output devices 18) or mechanical or electronic positioning devices such as accelerometer 21 or global-positioning-system receivers that help track the position, orientation, and movement of accessory 14.

Accessory 14 may optionally be connected to external electronic equipment 12 such as a computer or game console. Accessory 14 may, for example, be coupled to equipment 12 using communications path 16. Path 16 may be a wireless path or a wired path (e.g., a Universal Serial Bus path). Input such as user input, accessory position and orientation data and/or scene object position data from accessory 14 may be used to control equipment 12. For example, computing equipment 12 may supply display data to accessory 14 for display to a user that is based on input from accessory 14 (e.g., based on the position, orientation or motion of the accessory and/or based on the position or orientation objects in the vicinity of accessory 14).

The operation of device 14 may be controlled using input that is gathered from input-output devices 18 and/or positioning devices 22. For example, input from devices 18 and/or 22 may be processed by processing circuitry 20. Processing circuitry 20 may then direct input-output devices 18 to take suitable actions in response to the user input. For example, processing circuitry 20 may use input-output devices 18 to provide visual information to a user that depends on the input data received by components 18 and/or 22. Processing circuitry 20 may relay user input, accessory position and orientation data and/or scene object position data to external equipment 12 via path 16, if desired.

Figure 2:
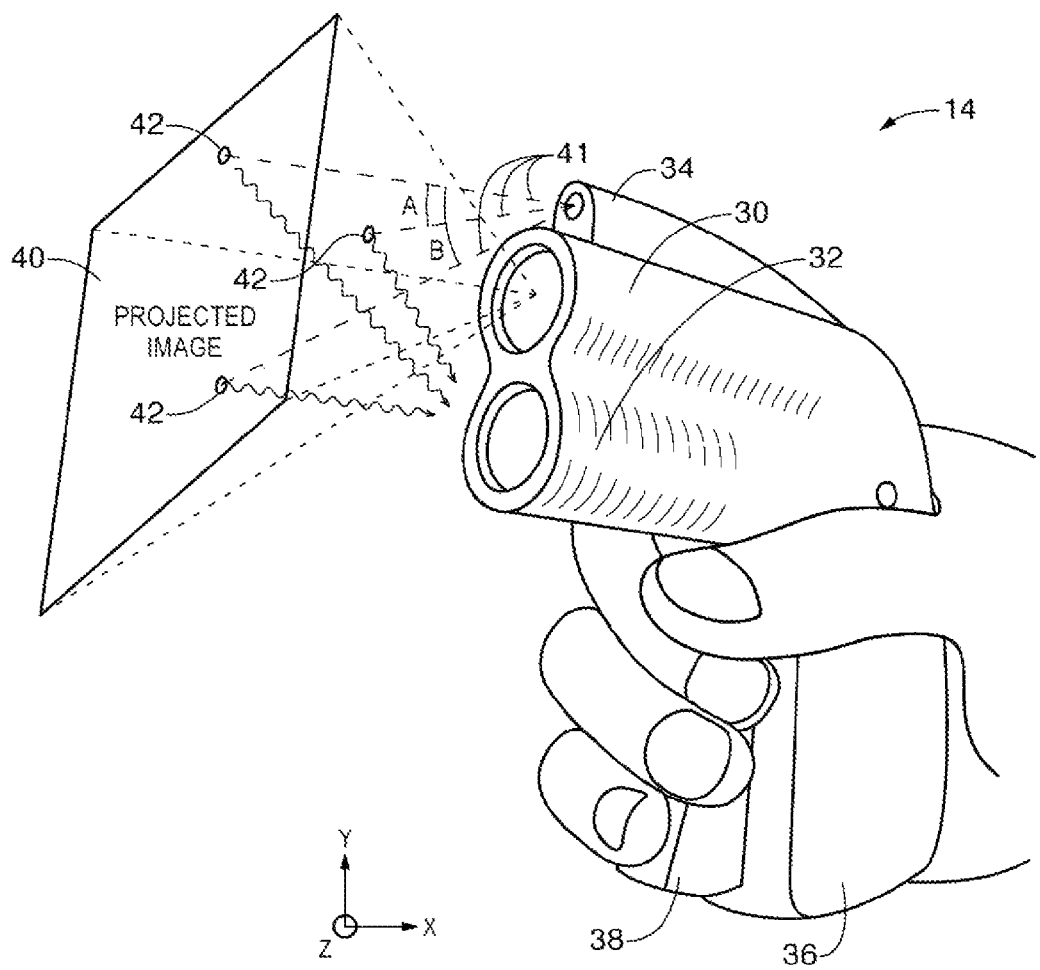
FIG. 2 is a perspective view of an illustrative video overlay accessory having a projection system in accordance with an embodiment of the present invention.

An illustrative configuration that may be used for accessory 14 is shown in FIG. 2. As shown in FIG. 2, accessory 14 may be implemented as a video overlay projection device. In the example of FIG. 2, accessory 14 includes light source 34 for projecting optical tracking spots, image projector 30 for projecting images such as video images onto real-world objects, light sensor 32, and user input component 38 mounted in housing structure 36.

Image projector 30 may include light-generating elements that project images such as projected image 40 onto real-world objects such as a wall or other object. User input component 38 (e.g., a button or trigger) can be operated by a user to operate accessory 14 (e.g., to initiate or terminate video overlay projection operations). Light source 34 (e.g., a near-infrared light source, optical light source or other light source) may include a laser diode or other light-emitting diode and, if desired, optical components (e.g. a grating or a slit) that project optical tracking spots 42 on real-world objects. Light source 34 may be used to generate one, two, three, four or more than four tracking spots 42.

Light sensor 32 may be a camera having an image sensor (e.g., an image sensor integrated circuit having an array of image pixels such as complementary metal-oxide-semiconductor (CMOS) image pixels, charge-coupled-device (CCD) image pixels, or image pixels based on other types of image sensor technology) that is used to capture images of the real-world scene. Images of tracking spots 42 in the captured images may be used to determine the distance between accessory 14 and the object onto which image 40 is being projected. Processing circuitry such as circuitry 20 of accessory 14 may be used to determine the distance between one or more spots 42 in the captured images (e.g., by determining the number of image pixels between each spot 42 in a captured image). Circuitry 20 may use the determined distances between spots 42 and known angles such as angles A and B between the projected beams that produce spots 42 to determine the physical distance from accessory 14 to a given object.

Accessory 14 may include multiple light sources 34 (e.g., multiple laser diodes) for producing multiple associated spots 42 or may include a single light source 34 having a light-generating element 37 (see FIG. 4 below for a cross-sectional view of light source 34) and an optical element 35 (e.g., a grating or slit) that generates two or more light beams 41 that produce spots 42. Light-generating element 37 may be, for example, a laser diode or other light-emitting diode. The pitch of the grating or the width of the slit may be configured to generate a desired angle (e.g., angles A and B) between beams 41. If desired, optical element 35 may be a grating structure that includes a two-dimensional grating pattern that produces a grid of beams 41 that spread at a common spot-generating angle to generate a grid of spots 42 covering a given field-of-view.

Camera 32 may include an image pixel array having a pixel projection angle that is different from the spot-generating angle. In this way, the number of pixels between spots 42 in captured images will change when the distance between accessory 14 and objects in the field-of-view changes and the determined distance between spots 42 in captured images may be used to determine physical distances to objects.

Processing circuitry 20 may use the determined distance between accessory 14 and the given object to focus image 40 and or to determine which display content is to be displayed in image 40.

If desired, light source 34 may be used to generate four or more beams 41 and corresponding spots 42. In this type of configuration, images of the four or more spots 42 may be used to determine an angular position of accessory 14 relative to an object. For example, when oriented perpendicular to an object, four or more evenly spaced beams will produce four or more evenly spaced spots in an image. At any angular position that is not perpendicular, the distance between the spots will be unevenly spaced. Based on measurements of this uneven distribution of spots in a captured image, the angle between accessory 14 and an object may be determined. This type of angular orientation data may be used by circuitry 20 to generate image corrections using projector 30 that can compensate for a detected tilt with respect to the object.

Processing circuitry 20 may also be used to generate a depth map of a real-world scene using the evenly spaced grid of spots 42. Objects that are relatively nearer to accessory 14 will have relatively closely spaced spots 42 in comparison with relatively further spaced spots 42 on a relatively further away object. Processing circuitry 20 may use the distribution of spots in a captured image to determine the relative (or absolute) distances to objects in the field-of-view.

Figure 3:
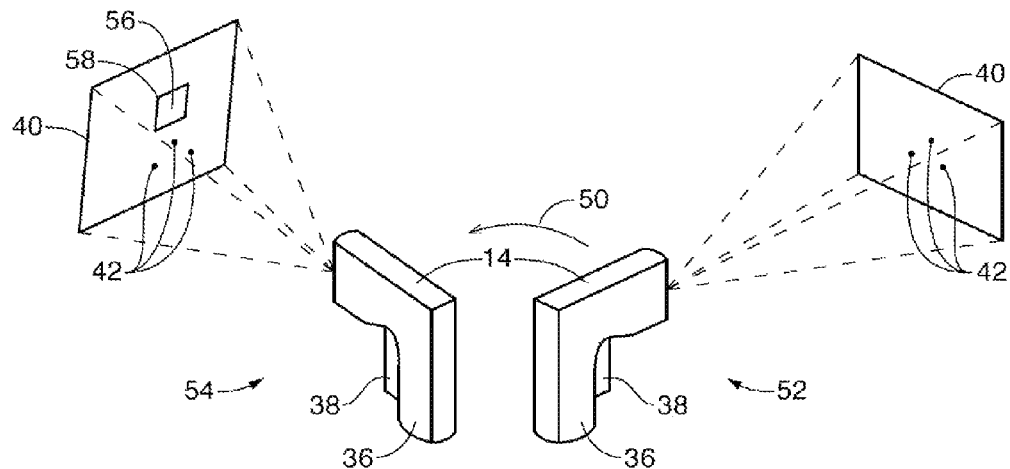
FIG. 3 is an illustrative diagram showing how a video overlay accessory having a projection system may present device-generated display content projected onto real-world objects in accordance with an embodiment of the present invention.

Accessory 14 may use positioning devices 22 and camera 32 to track the motion of accessory 14. For example, as shown in FIG. 3, images of spots 42 may be used to track the motion of accessory 14 from a first position such as position 52 to a second position such as position 52 (in direction 50) as spots 42 travel across real-world objects in a scene. Tracking the motion of accessory 14 using spots 42 (in addition to, or instead of tracking the motion of accessory 14 using accelerometer 21 (FIG. 1)) may allow relatively faster tracking of the motion of accessory 14 that prevents video content displayed in image 40 from lagging behind the motion of accessory 14.

Accessory 14 may generate display content to be displayed in image 40 based on the position of accessory 14. In the example of FIG. 3, no display content is included in image 40 at position 52. A display object such as display object 56 may be added to image 40 when accessory 14 is in position 54. Accessory 14 may be used to display object 56 at a location 58 that is independent of the position of accessory 14. For example, as a user moves accessory 14 around position 54, object 56 may remain at position 58 and may therefore move out of and into image 40 based on the motion of accessory 14.

In one example, object 56 may be a structural member of a building that is not visible to a person in the building (e.g., a wall stud inside of a wall). Accessory 14 (or computing equipment 12) may include stored building plans that include the position of the wall stud in the wall. When accessory 14 is scanned over that position in the wall, accessory 14 may project an image of the wall stud (based on the stored building plans) at that location.

In another example, object 56 may be an internal anatomical member of a person or an animal such as a muscle, a tendon, a bone, etc. Accessory 14 may include stored anatomical data such as textbook anatomical drawings or person-specific x-ray, MRI, or other imaging data that include the position of the anatomical member in the person or animal. When accessory 14 is scanned over that position in the person or animal, accessory 14 may project an image of the member onto the person or animal at that position.

In another example, object 56 may be structure in a cave. Accessory 14 may include stored cave-structure data such as image data, radar data, or other data that include the position of the cave structures in the cave. Accessory 14 may be used to provide a virtual tour of the cave by projecting images of the cave structures in a dark room when accessory 14 is aimed at the position of those objects in the virtual cave.

The examples of FIGS. 2 and 3 in which accessory 14 includes an image projector are merely illustrative. If desired, accessory 14 may be implemented as video overlay device having a beam splitter that presents images that appear to be located in a real-world scene as shown in FIG. 4.

Figure 4:
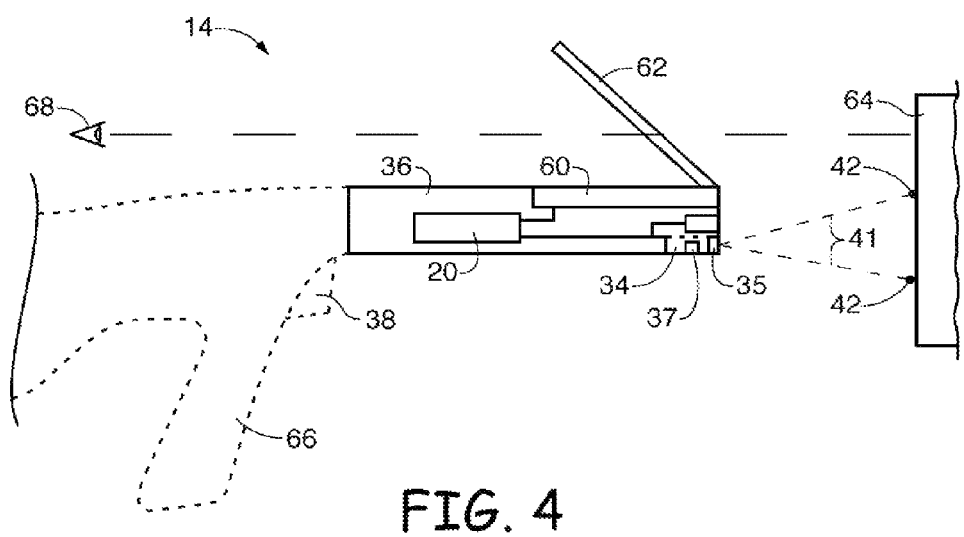
FIG. 4 is a cross-sectional side view of an illustrative video overlay accessory having a beam splitter in accordance with an embodiment of the present invention.

In the example of FIG. 4, accessory 14 includes display 60 and beam splitter 62 along with light source 34 and camera 32. Display 60 may be a liquid-crystal display (LCD) that generates images to be presented to a user such as user 68. Images generated by display 60 may be projected onto beam splitter 62. Beam splitter 62 may be a partially transparent beam splitter that allows user 68 to see through beam splitter 62 and view real-world objects such as object 62 through beam splitter 62. By allowing user 68 to see objects 64 through beam splitter 62 and projecting an image onto beam splitter 62, images generated by display 60 may appear to user 68 to be overlaid onto objects such as object 64. Image content in images generated using display 60 may be generated in response to images of spots 42 on object 64 that have been captured using camera 32. For example, processing circuitry 20 may overlay an image of a display object onto object 64 when accessory 14 is scanned to a particular position or when accessory 14 is moved to a particular distance from an object such as object 64.

As shown in FIG. 4, accessory 14 may include an extended portion such as plastic handle shaped portion 66 that includes a user input component such as trigger 38. Trigger 38 may be operated by user 68 when a particular object appears in an image generated by display 60.

Figure 5:
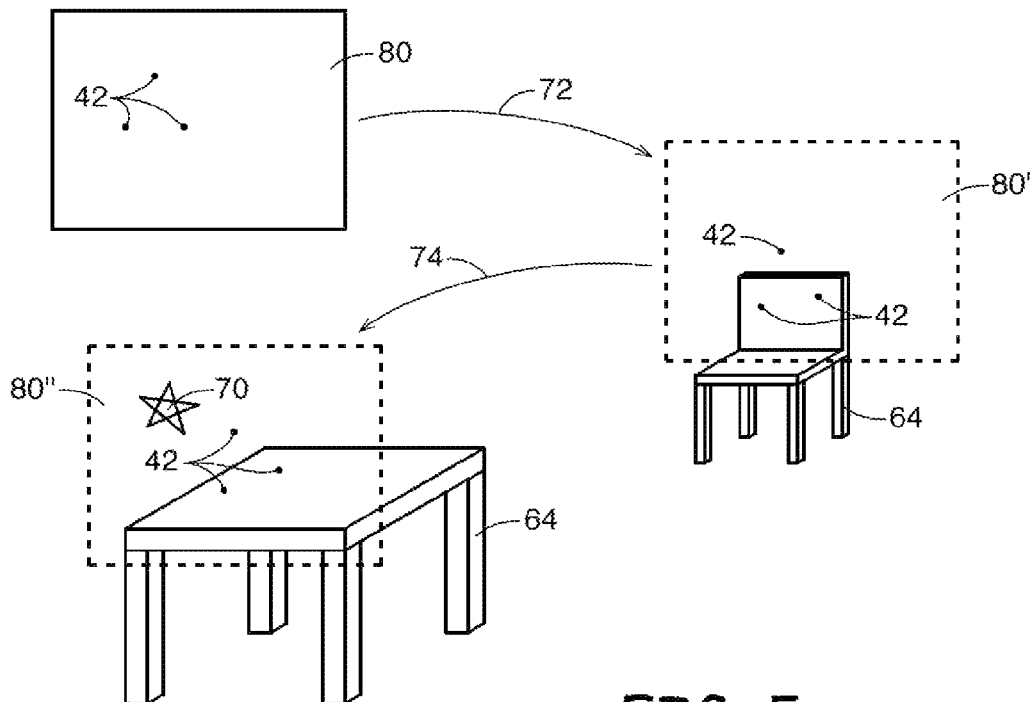
FIG. 5 is an illustrative diagram showing how a video overlay accessory having a beam splitter may present device-generated display content visually overlaid on real-world objects in accordance with an embodiment of the present invention.

For example, a user may view a portion such as portion 80 of a real world scene through beam splitter 62 as shown in FIG. 5. When the user moves beam splitter 62 in direction 72, a portion 80' of the real-world scene containing some or all of an object 64 (e.g., a chair) may become visible through beam splitter 62. In some positions, a real-world object 64 may be visible through beam splitter 62 while no visual display objects are presented. When the user moves the beam splitter 62 in direction 74, a portion 80" of the real-world scene containing some or all of one or more objects 64 (e.g., a table) may be visible through beam splitter 62 and display 60 may overlay a display object 70 onto the real-world scene. Display object 70 may be located at a position with respect to the real-world scene that does not change when the position of accessory 14 is changed. In this way, the user may be allowed to scan the real-world scene while trying to find display object 70. Accessory 14 may instruct the user to take a particular action when a particular display object is located. For example, user 68 may actuate trigger 38 when a display object 70 such as a video-game enemy or an educational object is recognized.

Processing circuitry 20 may be used to identify edges of objects 64 in a real-world scene in additional to generating a depth map of the scene. Using the edge information and depth information generated using images captured using camera 32, overlaid display objects 70 may be scaled video objects that blend into the viewed real-world scene as if there were an integral portion of the environment. For example, in a video gaming operational mode for accessory 14, a display object 70 may be a video game character that appears to emerge from behind an object 64 or from within an object 64.

An accessory such as accessory 14 that includes light source 34, camera 32, processing circuitry 20, display 60 and beam splitter 62 may provide a user with similar capabilities to those described in the examples above in connection with FIGS. 2 and 3. In particular, display object 70 may be a structural member of a building that is displayed using beam splitter 62 when accessory 14 is scanned over a particular position in the building (e.g., based on the stored building plans), object 70 may be an internal anatomical member of a person or an animal that is displayed using beam splitter 62 when accessory 14 is scanned over a particular position in the person or animal (based on text book or medically obtained images of the person or animal), object 70 may be structure in a cave that is displayed using beam splitter 62 when accessory 14 is scanned over a particular position in a room when accessory 14 is aimed at the position of that structure in a virtual cave, or object 70 may be a video game object or educational software object to be located by the user (as examples).

Figure 6:
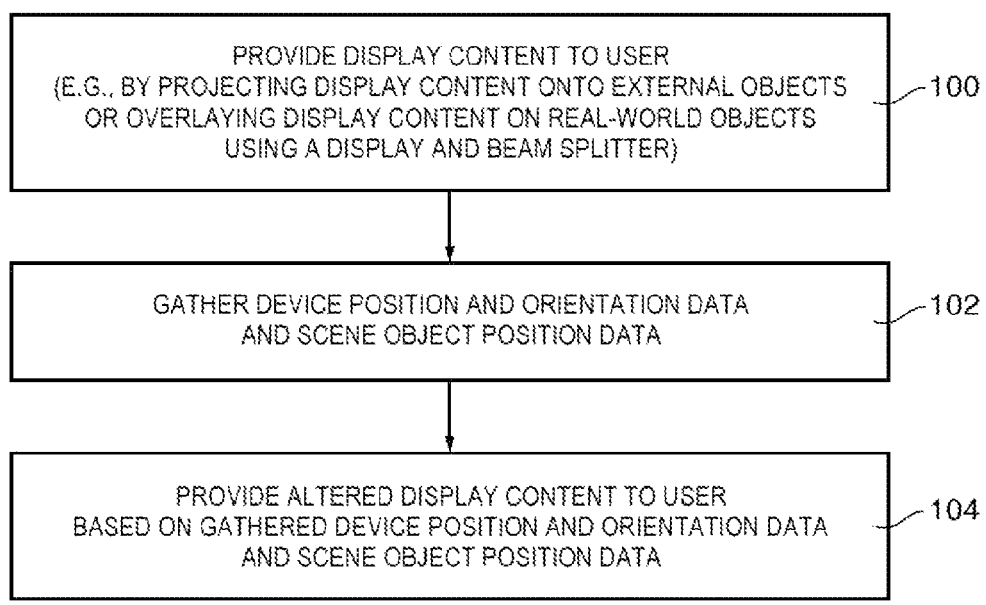
FIG. 6 is a flow chart of illustrative steps involved in presenting device-generated display content overlaid on real-world objects in accordance with an embodiment of the present invention.

Illustrative steps that may be used in operating a system such as system 10 having an accessory such as accessory 14 of FIG. 1 are shown in FIG. 6.

At step 100, display content may be provided to a user. Providing the display content to the user may include projecting display content onto external objects using a projector such as projector 30 of FIG. 2 or may include overlaying display content in front of real-world objects using a display such display 60 and a beam splitter such as beam splitter 62 of FIG. 4.

At step 102, device position and orientation data and scene object position data may be gathered using the accessory.

At step 104, altered display content may be provided to the user based on the gathered device position and orientation data and/or the gathered scene object position data. Altering the display content may include focusing the display content based on the position and orientation of the accessory and/or scene objects, updating display content based on the motion and/or the position of the accessory, or otherwise altering the display content based on the position data.

Figure 7:
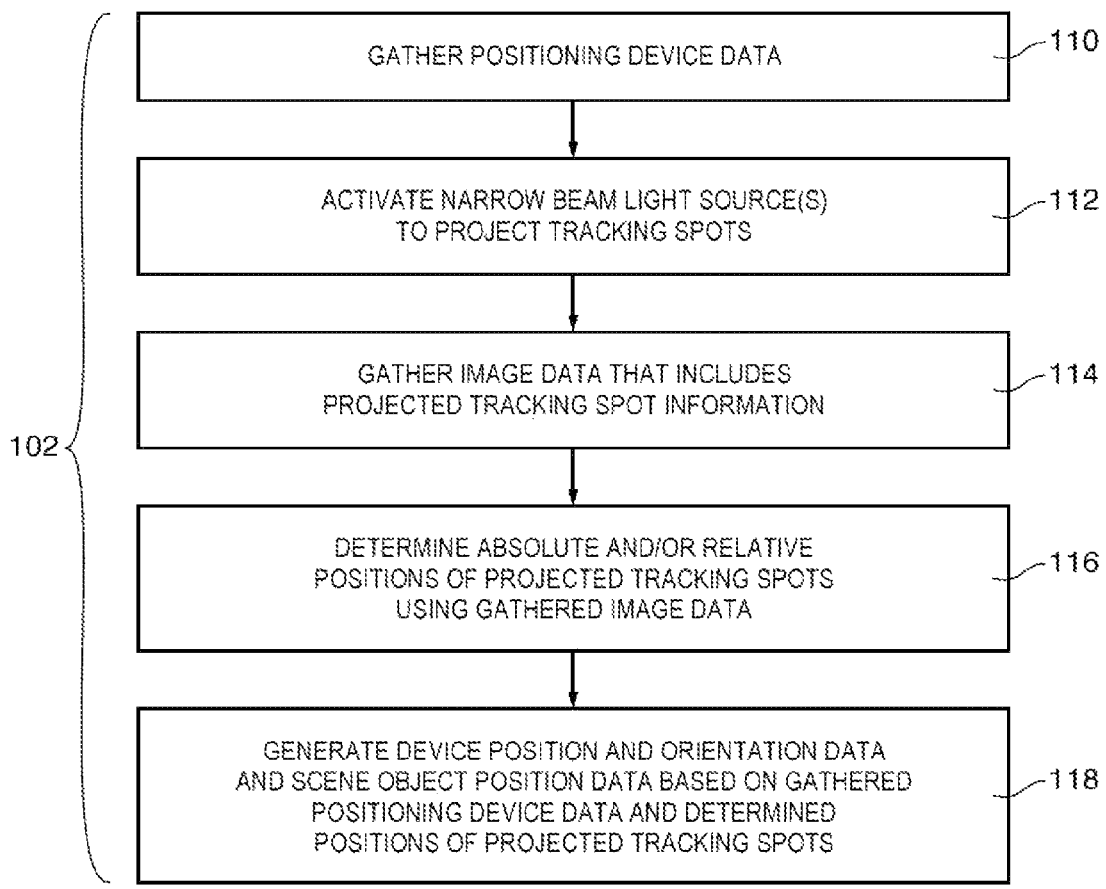
FIG. 7 is a flow chart of illustrative steps involved in gathering device position and orientation data and scene object position data as described in FIG. 6 in accordance with an embodiment of the present invention.

Illustrative steps that may be used in gathering device position and orientation data and scene object position data as described above in connection with step 102 of FIG. 6 are shown in FIG. 7.

At step 110, positioning device data such as accelerometer data may be gathered.

At step 112, one or more narrow-beam light sources such light source 34 of FIGS. 2 and/or 4 may be activated in order to project tracking spots such as spots 42 of FIGS. 2, 3, 4, and 5 onto one or more external objects.

At step 114, image data that includes projected tracking spot information may be gathered using, for example, camera 32 of FIG. 2 and/or FIG. 4. Projected tracking spot information may include pixel positions of tracking spots in the gathered image data.

At step 116, absolute and/or relative positions of the projected tracking spots may be determined using the gathered image data. Determining the absolute and/or relative position of the projected tracking spots may include determining a number of pixels between spots 42 in captured images and determining the absolute and/or relative position of the projected tracking spots using the determined number of pixels and known projection angles between narrow-beams that produced the tracking spots.

At step 118, device position and orientation data and scene object position data may be generated using the gathered positioning device data and/or the determined positions of the projected tracking spots. Generating device position and orientation data and scene object position data using the gathered positioning device data and/or the determined positions of the projected tracking spots may include generating device motion data that represents determined changes over time of the device position and/or orientation. Generating device position and orientation data and scene object position data using the gathered positioning device data and/or the determined positions of the projected tracking spots may include generating a depth map of the real-world scene, determining the location of edges of objects in the scene or determining an angle between the accessory and an object in the scene (as examples).

Figure 8:
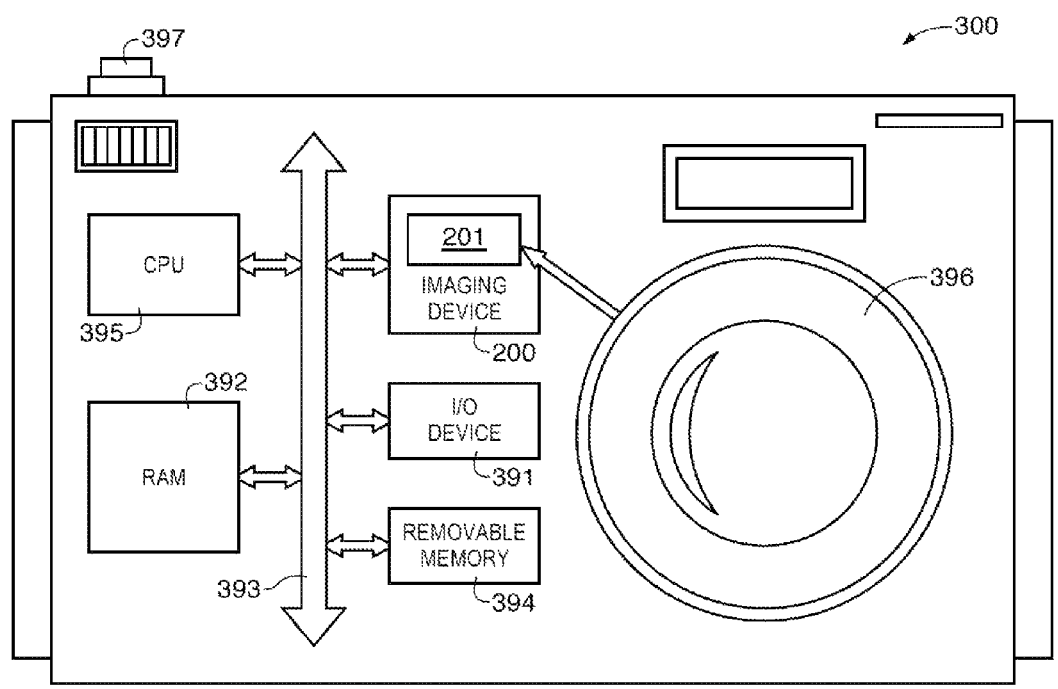
FIG. 8 is a block diagram of a processor system employing the embodiment of FIG. 1 in accordance with an embodiment of the present invention.

FIG. 8 shows, in simplified form, a typical processor system 300, such as accessory 14 of FIG. 1. Processor system 300 is exemplary of a system having digital circuits that could include imaging device 200 (e.g., an image sensor in camera 30 of FIG. 2 and/or FIG. 4). Without being limiting, such a system could include a computer system, still or video camera system, scanner, machine vision, vehicle navigation, video phone, surveillance system, auto focus system, star tracker system, motion detection system, image stabilization system, video gaming system, video overlay system, and other systems employing an imaging device.

Processor system 300, which may be a digital still or video camera system, may include a lens such as lens 396 for focusing an image onto a pixel array such as pixel array 201 when shutter release button 397 is pressed. Processor system 300 may include a central processing unit such as central processing unit (CPU) 395. CPU 395 may be a microprocessor that controls camera functions and one or more image flow functions and communicates with one or more input/ output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating video overlay systems having a portable accessory such as accessory 14 of (for example) FIG. 1 with a combination of a light source 34, camera 32, and video overlay components such as display 60 and beam splitter 62 of FIG. 4 or image projector 30 of FIG. 2.

Light sources may include one or more laser diodes or one or more other light-emitting diodes that project beams of light at known angles onto objects in a scene. A camera may include an array of image pixels for capturing images of spots that have been generated by the projected beams. The processing circuitry may be used to determine distances to objects and locations of edges of objects using the images of the projected spots.

An image projector may be used to project display images directly onto objects in the scene or a display may generate display images to be viewed on a beam-splitting structure that allows the user to view the display images on the beam splitter in addition to viewing portions of the real world scene through the beam splitter. In this way display objects may be scaled and overlaid onto a portion of a real world scene.

This type of system may allow a user to interact with their surroundings and to project or view images on surfaces or in other locations in the environment. A system of this type may be used to generate images of the internal construction of objects in a real-world scene, or to overlay other images that have been scaled to the size and position of objects in the real-world scene. In this way, a user may be provided with the ability to locate otherwise invisible portions of an object and to align images of the invisible portions with visible portions of the object.

The foregoing is merely illustrative of the principles of this invention which can be practiced in other embodiments.

What is claimed is:

1. An image display system, comprising:
   a light source configured to project optical tracking spots onto an external object, wherein the light source comprises a grating structure that generates a plurality of light beams for projecting the optical tracking spots, wherein the grating structure comprises a two-dimensional grating pattern configured to produce the plurality of light beams, and wherein the plurality of light beams are separated by a common angle;
   a camera configured to capture images of the projected optical tracking spots;
   an image projector configured to project display images onto the external object;
   processing circuitry configured to generate the display images to be projected using the captured images of the projected optical tracking spots; and
   a housing structure in which the light source and the image projector are mounted.

2. The image display system defined in claim 1 wherein the camera comprises an image pixel array having a pixel projection angle that is different from the common angle.

3. The image display system defined in claim 1, wherein the housing structure is configured to fit into a human hand, and wherein the camera and the processing circuitry are mounted in the housing structure.

4. The image display system defined in claim 3, further comprising a user input component mounted in the housing structure.

5. The image display system defined in claim 4 wherein the user input component comprises a button.

6. An image display system, comprising:
   a light source configured to project optical tracking spots onto an external object;
   a camera configured to capture images of the projected optical tracking spots;
   a partially transparent beam splitter;
   a display that projects device-generated display content onto the partially transparent beam splitter, wherein when a portion of a real-world scene is viewed through the partially transparent beam splitter, the device-generated display content that is projected onto the partially transparent beam splitter appears to be overlaid onto the portion of the real world scene; and
   processing circuitry configured to generate position data by determining distances between the optical tracking spots in the captured images.

7. The image display system defined in claim 6 wherein the display comprises a liquid crystal display.

8. The image display system defined in claim 6 wherein the light source comprises a plurality of light sources configured to form a plurality of light beams for projecting the optical tracking spots.

9. The image display system defined in claim 6 wherein the light source comprises a light-generating element and a grating structure configured to form a plurality of light beams for projecting the optical tracking spots.

10. The image display system defined in claim 6 wherein the light source comprises a light-generating element and a slit configured to form a plurality of light beams for projecting the optical tracking spots.

11. The image display system defined in claim 6 wherein the light source comprises a laser diode.

12. The image display system defined in claim 6 wherein the processing circuitry is further configured to generate the device-generated display content based on the generated position data.

13. The image display system defined in claim 6 wherein the camera includes at least one complementary metal-oxide-semiconductor image pixel.

14. The image display system defined in claim 6 wherein generating the position data comprises determining a number of pixels between the optical tracking spots in a given one of the captured images.

15. A system, comprising:
   a central processing unit;
   memory;
   input-output circuitry; and
   a video overlay accessory, wherein the video overlay accessory comprises:
      a light source that generates optical tracking spots in a real world scene;
      a camera; and
      video overlay components that overlay device-generated display content over objects in the real-world scene, wherein the video overlay components change the device-generated display content based on the position of the video overlay accessory relative to the objects in the real-world scene, and wherein the camera captures images of the real world scene that include the optical tracking spots and the overlaid device-generated display content, wherein the video overlay components comprise:

a partially transparent beam splitter; and a display that projects the device-generated display content onto the partially transparent beam splitter.

16. The system defined in claim 15 wherein the video overlay components comprise an image projector that projects the device-generated display content onto a surface of at least one of the objects in the real-world scene.

* * * * *